(12) United States Patent
 Glave (10) Patent No.: US 8,800,061 B2
(45) Date of Patent: Aug. 5, 2014

(54) AUTOMATIC CONTROL OF A SECURITY PROTECTION MODE OF AN ELECTRONIC DEVICE

(75) Inventor: Geoffrey John Glave, Vancouver (CA)

(73) Assignee: Absolute Software Corporation, Vancouver, British Columbia ( * ) Notice: Subject to any disclaimer, the term of this patent is extended or adjusted under 35 U.S.C. 154(b) by 718 days.

(21) Appl. No.: 12/718,815

(22) Filed: Mar. 5, 2010

(65) Prior Publication Data
US 2010/0229248 A1   Sep. 9, 2010

Related U.S. Application Data

(60) Provisional application No. 61/158,114, filed on Mar. 6, 2009.

(51) Int. Cl.
*G08B 29/00* (2006.01)
*G06F 21/88* (2013.01)

(52) U.S. Cl.
CPC ........................................ *G06F 21/88* (2013.01)
USPC ........ 726/34; 726/2; 726/26; 726/27; 726/28; 726/29; 726/35; 709/224

(58) Field of Classification Search
USPC ...................... 709/224; 726/34–35, 26–29, 2
See application file for complete search history.

(56) References Cited

U.S. PATENT DOCUMENTS

| | | | | |
|---|---|---|---|---|
| 6,163,693 A | * | 12/2000 | Rydbeck | 455/418 |
| 6,244,758 B1 | * | 6/2001 | Solymar et al. | 709/224 |
| 6,266,525 B1 | * | 7/2001 | Peterson | 455/410 |
| 6,300,863 B1 | * | 10/2001 | Cotichini et al. | 340/5.8 |
| 6,356,299 B1 | * | 3/2002 | Trosino et al. | 348/128 |
| 6,433,685 B1 | * | 8/2002 | Struble et al. | 340/571 |
| 6,501,380 B1 | | 12/2002 | Jakobsson | |
| 6,507,914 B1 | | 1/2003 | Cain et al. | |
| 6,639,513 B2 | | 10/2003 | Olsen et al. | |
| 6,654,890 B1 | | 11/2003 | Girard | |
| 7,266,849 B1 | | 9/2007 | Gregory et al. | |
| 7,510,580 B2 | | 3/2009 | Zakaria | |

(Continued)

OTHER PUBLICATIONS

International Search Report mailed on Jul. 16, 2010, in counterpart PCT application No. PCT/CA2010/000359.

(Continued)

*Primary Examiner* — Mohammad A Siddiqi
(74) *Attorney, Agent, or Firm* — Knobbe, Martens, Olson & Bear, LLP (57) ABSTRACT

An automated method and apparatus is provided for deterring unauthorized use or theft of electronic devices, or other sorts of items into which a tracking device has been installed, particularly those in a distribution channel. The automated method is performed by a computer system of a monitoring center, and comprises the steps of: receiving a call over a network from the electronic device, said call initiated by an agent installed on the electronic device, said agent including functionality for tracking usage of the electronic device and for reporting information regarding said usage to the monitoring center, the agent thereby facilitating recovery of the electronic device when stolen; in response to the call, determining, at least, whether a sale of the electronic device has been reported; and by communication with the agent, causing the electronic device to enter into a state that is dependent, at least, upon the determination of whether a sale of the electronic device has been reported, said state affecting whether the agent reports information to the monitoring center regarding usage of the electronic device.

16 Claims, 6 Drawing Sheets

(56) References Cited

U.S. PATENT DOCUMENTS

| | | | |
|---|---|---|---|
| 7,567,795 B1 * | 7/2009 | Champion et al. | 455/410 |
| 8,163,035 B2 * | 4/2012 | Bhansali et al. | 726/35 |
| 8,241,369 B2 * | 8/2012 | Stevens | 726/35 |
| 8,441,348 B2 * | 5/2013 | Loveland | 340/539.13 |
| 2001/0052855 A1 | 12/2001 | Ogilvie | |
| 2002/0121975 A1 | 9/2002 | Struble et al. | |
| 2003/0074577 A1 | 4/2003 | Bean et al. | |
| 2004/0064730 A1 | 4/2004 | Kamiyama et al. | |
| 2004/0111640 A1 * | 6/2004 | Baum | 713/201 |
| 2004/0183672 A1 | 9/2004 | Krishan et al. | |
| 2005/0216360 A1 | 9/2005 | Osterer | |
| 2005/0216757 A1 | 9/2005 | Gardner | |
| 2005/0257209 A1 | 11/2005 | Adams et al. | |
| 2005/0273628 A1 | 12/2005 | Onischuk | |
| 2006/0272020 A1 | 11/2006 | Gardner | |
| 2008/0250510 A1 * | 10/2008 | Stevens | 726/35 |
| 2008/0301820 A1 | 12/2008 | Stevens | |
| 2009/0150170 A1 * | 6/2009 | Junger et al. | 705/1 |
| 2009/0260089 A1 | 10/2009 | Chang et al. | |
| 2010/0064046 A1 * | 3/2010 | Jung et al. | 709/227 |
| 2010/0094996 A1 * | 4/2010 | Samaha | 709/224 |
| 2010/0115417 A1 | 5/2010 | Cox et al. | |
| 2011/0057797 A1 * | 3/2011 | Parker et al. | 340/568.1 |
| 2012/0003991 A1 * | 1/2012 | Loveland | 455/456.1 |
| 2013/0241729 A1 * | 9/2013 | Jung et al. | 340/539.13 |

OTHER PUBLICATIONS

Non-Final Office Action issued on Jul. 2, 2012, in commonly-owned U.S. Appl. No. 12/614,365 (see Examiner's Note on p. 10).

* cited by examiner

AUTOMATIC CONTROL OF A SECURITY PROTECTION MODE OF AN ELECTRONIC DEVICE

CROSS-REFERENCE TO RELATED APPLICATIONS

This application claims the benefit of U.S. provisional patent application No. 61/158,114 filed Mar. 6, 2009, the disclosure of which is hereby fully incorporated by reference.

BACKGROUND

1. Technical Field

This disclosure relates to methods and apparatus for deterring the unauthorized use and theft of electronic devices, particularly those in a distribution channel, and to the implementation of a tracking agent for the recovery of stolen devices.

2. Description of the Related Art

Laptops and other electronic devices such as personal computers, gaming devices, communications devices and audio devices, as well as systems such as photocopiers that include devices containing processors are often stolen during transit from the manufacturer to the retailer, from various warehouses or containers in the distribution channel, and from retailers' stores. The opportunity for theft is further exacerbated in cases where retailers of such devices implement an 'open' sales environment, allowing customers to feel, touch and handle products.

Manufacturers, distributors and retailers do not necessarily have the appropriate staff or the systems to properly track items of inventory that are en route to retailers' stores, or that are in retailers' stores. Purchasers do not necessarily want to be inconvenienced by having to enter an authorization code in order to get their newly purchased laptop or other electronic device to work properly. It would accordingly be useful if there were an anti-theft protection solution that is more convenient for staff in the supply chain as well as for the end user.

U.S. patent application Ser. No. 12/129,568 to Stevens, et al., published on 4 Dec. 2008 as publication no. US2008/0301820 relates to a theft protection system that allows limited use of an electronic device after purchase, but ultimately requires the user to enter an authorization code for normal, continuing operation.

U.S. Pat. No. 7,266,849 issued on Sep. 4, 2007 to Gregory, et al. describes a method for deterring unauthorized use of an electronic device. The method comprises prompting a user for identity information before permitting use of the device. This system may be inconvenient to a genuine owner of a new electronic device. For example, on inputting a wrong password or no password, a genuine owner will not be able to operate the device, and it may not be possible at that instant to find the correct password or contact the manufacturer or vendor for assistance.

U.S. Pat. No. 6,654,890 issued on Nov. 25, 2003 to Girard relates to the wireless locking of a computer platform to discourage theft as the platform is transported in a distribution channel. This system involves an automated wireless transmission of an authentication key into a computer at the factory. An authentication key is sent separately to the intended recipient who is required to enter it.

U.S. Pat. No. 7,567,795 issued on Jul. 28, 2009 to Champion et al. discloses a system for protecting mobile phones. If a phone is used without having been recorded as sold, then calls are directed to a fraud centre and the onus is put on the user to demonstrate that use of the phone is legitimate.

SUMMARY

This summary is not an extensive overview intended to delineate the scope of the subject matter that is described and claimed herein. The summary presents aspects of the subject matter in a simplified form to provide a basic understanding thereof, as a prelude to the detailed description that is presented below. Neither this summary nor the following detailed description purports to define or limit the invention; the invention is defined only by the claims.

By way of a general overview, an automated method and apparatus is provided for deterring unauthorized use or theft of electronic devices (or other sorts of items into which a tracking device has been installed), particularly those in a distribution channel. In certain embodiments, an agent is installed in an electronic device, such as a laptop, by or on behalf of a manufacturer when the electronic device is made. Each agent and/or device is identifiable by a serial number. The manufacturers, distributors and/or retailers provide, to a monitoring centre, details of devices that leave the distribution channel by being sold or stolen. At the monitoring centre, agents for devices that are known to have been sold or stolen are flagged, such that when those agents automatically call in to the monitoring centre (such as through an internet connection), they can be instructed to disable themselves for devices that are sold, or provide tracking information if the devices are stolen.

Agents that are flagged to be disabled, or alternately, removed, allow legitimate purchasers of the corresponding devices to use them without being tracked.

Agents that are flagged because devices have been reported stolen are not removed or disabled, but are instructed or allowed to perform tracking functions, such as providing GPS location information, IP addresses, taking photos, providing screenshots, capturing keystrokes, etc. in order to facilitate the recovery of the stolen devices.

In cases where a device leaves the distribution channel and/or retailer's store without having been recorded as sold or stolen, its agent will still call in to the monitoring centre when it is connected to the internet. In these situations, the agent or device is flagged as a "rogue" agent or device, use of the device is permitted as it is not known whether the user is legitimate or not, and the retailer or manufacturer whose distribution channel the device was in is automatically informed of the existence of the rogue device. The agent may also be instructed to perform rogue device procedures which are different from procedures for sold or stolen devices.

Rogue device procedures, such as providing an alert on the device, may help to alleviate privacy issues in the case where a retailer sold a trackable device and forgot to inform the monitoring centre to stop tracking. Rogue device procedures may also aid in the discovery of a theft of which the retailer was previously unaware.

BRIEF DESCRIPTION OF THE DRAWINGS

For a fuller understanding of the nature and advantages of the disclosed subject matter, as well as the preferred mode of use thereof, reference should be made to the following detailed description, read in conjunction with the accompanying drawings. In the drawings, like reference numerals designate like or similar steps or components.

DETAILED DESCRIPTION OF THE PREFERRED EMBODIMENTS

Specific embodiments of the disclosed systems and methods will now be described with reference to the drawings. Nothing in this detail description is intended to imply that any particular component, feature, or step is essential to the invention.

Terminology

Retailer's agent, Computrace™ agent or CT agent: As used herein, each of these terms refers to an agent that is used to protect an electronic device while in the distribution channel. The agent may be a software, firmware or hardware agent, or a combination thereof. The agent is configured to disable itself after a first call to a monitoring centre when the device is in the hands of a legitimate purchaser, and such disabling is preferably permanent for the protection of privacy. The agent may be an agent supplied by Absolute Software Corporation, and may have persistent qualities such as those disclosed in U.S. Publication Nos. 2005/0216757 and 2006/0272020, the disclosures of which are hereby fully incorporated by reference. By way of example, this agent may be partly or fully located in the BIOS, or in a hidden location on a hard drive, such as in a partition gap. After a legitimate purchase, a retailer's agent may be replaced, upgraded or reinstalled by a legitimate purchaser in order to give continued protection under the purchaser's account. Such an upgrade may be to L4L, LoJack™, or LoJack for Laptops™, all of which refer to the usual tracking agent a consumer may purchase and install on a device such as a laptop that is to be protected. In some embodiments, a single agent couple may be provided that acts as both a retailer's agent and, following activation by a legitimate purchase, as a usual tracking agent.

L4L™, LoJack™, LoJack for Laptops™: All of these refer to the usual tracking agent a consumer may purchase and install on a device to be protected. The agent may be a software, firmware or hardware agent, or a combination thereof. The agent may be an agent supplied by Absolute Software Corporation, and may have persistent qualities such as those disclosed in U.S. Publication Nos. 2005/0216757 and 2006/0272020, the disclosures of which are hereby fully incorporated by reference. By way of example, this agent may be partly or fully located in the BIOS, or in a hidden location on a hard drive, such as in a partition gap.

Agent: When unqualified, may refer to either or both of the above. An agent may communicate with a monitoring centre over an internet connection. Other communication links are possible, such as switched communications networks, private and public intranet, radio networks, satellite networks, and cable networks. Also possible are, for example, WWAN, WAN, LAN, etc., value-added networks, broadcast networks, cellular networks, and a homogeneous or heterogeneous combination of such networks. Communications may be initiated by either the agent or by the monitoring centre.

Monitoring Centre (MC): A typical monitoring centre may comprise call servers and software, web servers and web applications, database servers and databases, authentication systems, administrative systems and back end processing systems, and may or may not be staffed. A monitoring centre can take calls from agents over various bearer services such as IP or PSTN, and can identify computers and other electronic devices, determine their licensing level and record their attributes and location, install and update software on monitored computers, and set up data-delete services and theft-recovery tools. A monitoring centre can provide a web interface for users to generate reports of their monitored assets and their locations. It may include interfaces with gateways for SMS and may potentially communicate with computers which are switched off but have separately powered security modules. In some cases, the monitoring centre may include computing devices (servers, etc.) that are located remotely from one another.

Serial Number (SN): Each agent and/or electronic device to be protected may have a serial number for its identification. The serial number may be allocated at manufacture, or it may be an allocated, electronic serial number that is derived from the individual serial numbers of the components within the device.

Serial Number Manager (SNM) system: This may be a third party system and/or company that manages devices with serial numbers. It may also be integral to a distribution company, a security company and/or a retailer. Typically, these serial number manager systems keep track of the various different statuses of the devices that they are managing, such as keeping track of whether they have been manufactured, shipped, sold, lost, stolen, returned to the store, been damaged, been repaired etc. Such companies have systems that facilitate tracking of products between different outlets of the same retail chain. Stores using serial number managers can be physical or they can be online.

Call: The term "call" is used herein to refer to a communication that occurs between an electronic device and a monitoring centre. This communication may occur over any of a variety of types of communication networks (e.g., the internet, a mobile phone network, a proprietary wireless data network, etc.), and according to any of a variety of communication protocols. Typically, the call is initiated by an agent installed on the electronic device (e.g., by execution of agent code by device), in which case the call may be referred being made by the agent or by the device. The call is typically made invisibly to (without the knowledge of) the user of the device.

Exemplary Embodiment

The detailed descriptions that follow are presented partly in terms of methods or processes, symbolic representations of operations, functionalities and features of the subject matter disclosed and claimed herein. These method descriptions and representations are the means used by those skilled in the art to most effectively convey the substance of their work to others skilled in the art. A software implemented method or process is here, and generally, conceived to be a self-consistent sequence of steps leading to a desired result. These steps require physical manipulations of physical quantities. Often, but not necessarily, these quantities take the form of electrical or magnetic signals capable of being stored, transferred, combined, compared, and otherwise manipulated. It will be further appreciated that the line between hardware and software is not always sharp, it being understood by those skilled in the art that software implemented processes may be embodied in hardware, firmware, or software, in the form of coded instructions such as in microcode and/or in stored programming instructions.

All of the methods and tasks described herein, excluding those identified as performed by a human, may be performed and fully automated by a computer system, and may be embodied in software code modules executed by one or more general purpose computers. The code modules may be stored in any type of computer-readable medium or other computer storage device. Some or all of the methods may alternatively be embodied in specialized computer hardware. The computer system may, in some cases, include multiple distinct computers or computing devices (e.g., mobile devices, physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. Where the system includes multiple computing devices, these devices may, but need not, be co-located. The results of the disclosed methods and tasks may be persistently stored by transforming physical storage devices, such as solid state memory chips and/or magnetic disks, into a different state.

By way of example and not limitation, the subject matter disclosed and claimed herein is described in detail below in relation to laptop computer distribution at the retail level. The inventive concept is, of course, applicable to loss prevention at all levels in a distribution channel (eg: manufacturer, shipper, warehouse, customs, wholesalers, resellers, distributors, etc.) and in relation to other types of electronic devices such as iPads™, iPods™, Blackberrys™, smart phones or other mobile communication devices, gaming consoles, personal digital assistants, office equipment such as fax machines, memory devices, etc, medical equipment, any device with a processor, or a tracking device that is designed to be incorporated in another item that passes through a distribution channel.

Figure 1:
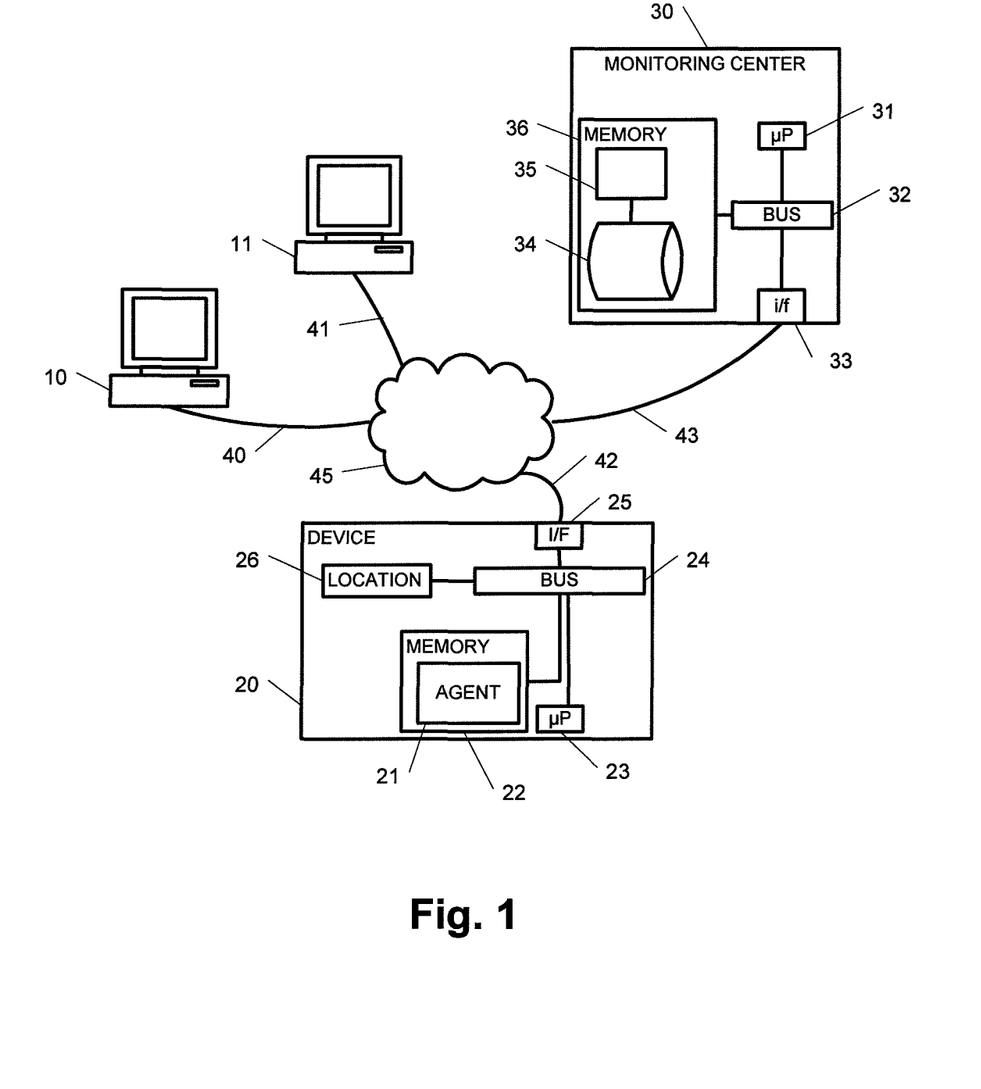
FIG. 1 is a schematic functional block diagram of an apparatus in accordance with an embodiment of the disclosed subject matter.

FIG. 1 is a schematic functional block diagram of a system in accordance with an embodiment of the disclosed subject matter. A manufacturer, which could be an OEM (i.e. Original Equipment Manufacturer), manufactures an electronic device 20 such as a laptop computer. The device comprises an electronic memory 22 that stores computer readable instructions forming an agent 21. Also in the device is a processor 23 operably connected to the memory 22 via a bus 24. Optionally included is a location determination device 26, such as a GPS device, a system of accelerometers, a compass, or combinations of these. Location information may also be determined by the agent 21 if, for example, it is configured to determine IP addresses. The device 20 can be connected to a network 45 via interface 25 and communication link 42. The network 45 may be the internet or a telecommunications network or a combination of these.

After the device 20 has been manufactured, the manufacturer can provide, using computer terminal 10, the serial number of the agent 21 and/or the identification of the device 20 to the monitoring centre 30. Communication may be via communication link 40, internet 45 and communication link 43. The monitoring centre 30 stores, in database 34 in memory 36, data that identifies the device 20 and links it to the agent 21, such that when the agent 21 communicates with the monitoring centre 30, the monitoring centre 30 can determine the identification of device 20 that contains the agent 21.

The monitoring centre 30 comprises an electronic memory 36 that stores computer readable instructions 35 for controlling communications with terminal 10 and device 20, when processed by processor 31. The processor 31 is operably connected to the memory 36 via bus 32. The memory 36 also contains a database 34 that has information relating to the various serial numbers of the agents 21 and/or the identification numbers of the devices 20 that they are installed in. Various device statuses and/or flags may be stored in memory 36. An interface 33 is also present in the monitoring centre 30 and connected to processor 31 via bus 32, this interface 33 allowing connection to the internet 45 or telecommunication network using communication link 43.

When a device 20 has been shipped to a store and subsequently sold, the retailer can enter details of the sale on computer terminal 11, connected to the monitoring centre 30 via communication link 41, network 45 and communication link 43. Details may be entered automatically as the sale is processed, or they may be entered in a separate step. For example, it may be possible to trigger the process by simply scanning a barcode on the device 20 or the packaging of the device 20. A third party software system, provided by a serial number manager ("SNM"), may be used to facilitate the process of recording that a sale of a device 20 has taken place.

Figure 2:
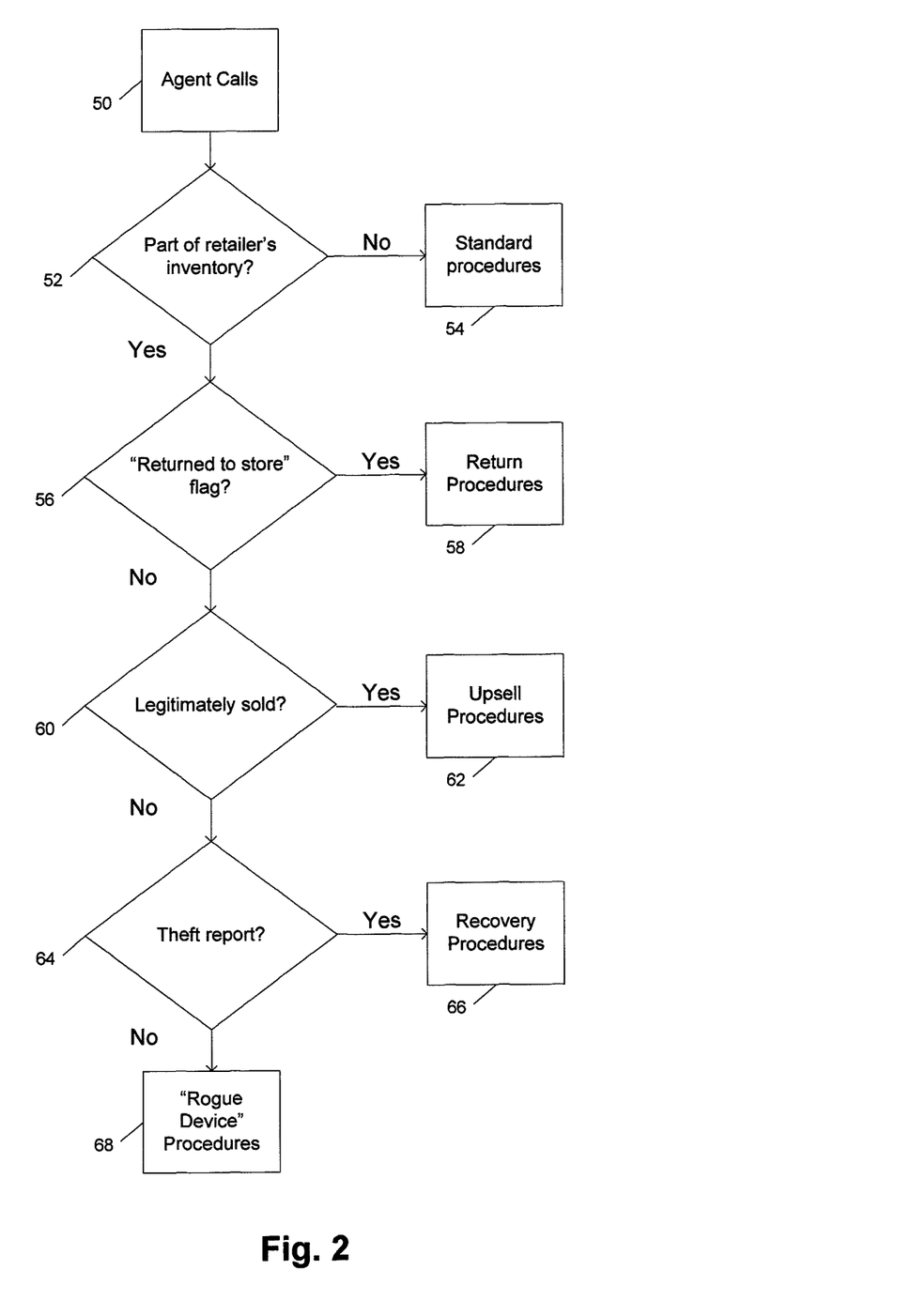
FIG. 2 is a functional flow diagram schematically representing the flow process performed by a monitoring centre in accordance with embodiments of the disclosed subject matter.

FIG. 2 is a functional flow diagram schematically representing the main flow process performed by a monitoring centre in accordance with embodiments of the disclosed subject matter. In this example, the monitoring centre is set up to monitor devices that have not necessarily been protected in a distribution channel, as well as devices 20 that have been protected in the distribution channel according to the disclosed subject matter.

At step 50, a particular agent 21 calls the monitoring centre 30 for the first time, and the monitoring centre 30 determines 52 whether or not the particular associated device 20 is part of a given retailer's protected inventory. This determination 52 may be made by accessing the database 34 to determine whether the serial number associated with the calling agent 21 is registered with a retailer. If it is not, then standard procedures are followed 54. If, however, the calling agent 21 in device 20 is determined to be part of a given retailer's inventory, then further checks (discussed below) are made as to the status of the device 20.

The next determination is as to whether the device has been flagged as 'Returned to store' 56. This determination 52, and the determination represented by block 60 (discussed further below), may be made based on information previously reported to the monitoring centre 30 by the retailer's computer system, or by remotely querying the retailer's system in response to the call. It could be that the device 20 was taken home by a customer, opened, not connected to the internet and returned to the store. If this is the case, some stores may not be interested in re-selling the device 20 to another customer, and may dispose of it via other channels. In this case, the agent may be instructed to perform 'Return Procedures' 58, described below.

If the device 20 has not been flagged as 'Returned to store' 56, then the monitoring centre 30 determines at step 60 whether the device has been recorded as legitimately sold. If it has, then the agent 21 may optionally be instructed to perform 'Upsell Procedures' 62. This may involve offering the customer an opportunity to purchase continuing protection using the agent 21, another version of agent 21, or a replacement agent.

If the device 20 has not been legitimately sold 60, the monitoring centre 30 determines whether a theft report exists 64 for the particular device 20. If the device has been stolen and there is a theft report that has been lodged with the monitoring centre 30, then the agent 21 is instructed to undergo 'Recovery Procedures' 66 and provide tracking information.

If, however, there is no theft report 64, the device 21 is determined to be a 'Rogue Device', because it is somehow outside of the distribution channel without knowledge of the staff in the distribution channel or staff in the store. The agent 21 in the device 20 is therefore instructed by the monitoring centre 30 to perform 'Rogue Device Procedures' 68. To add to the explanation in this figure, the "Rogue Computer" procedures initiated may occur if, for example:

a) a computer is sold but has not yet been recorded as sold in the SNM system;
b) a computer is connected to the internet from within a store as a demonstration model or for the use of the staff; or
c) a computer is stolen from the store without the store personnel realizing it.
d)

TABLE 1

| | Flags | | | | |
| --- | --- | --- | --- | --- | --- |
| | Reported stolen | Sold flag | Call made | Opened if returned | Status | Action |
| 1 | Yes | No | No | | Stolen from channel | Track on connection |
| 2 | Yes | No | Yes | | Stolen from channel | Track |
| 3 | No | Yes | No | | Sold | Disable on connection |
| 4 | No | Yes | Yes | | Sold | Disable |
| 5 | No | No | No | | In channel | None |
| 6 | No | No | Yes | | Rogue | Alert channel personnel |
| 7 | No | Yes | No | Yes | For disposal | Disable on connection |
| 8 | No | Yes | Yes | Yes | For disposal | Disable |
| 9 | No | Yes | No | No | Re-stock | Set 'sold' flag to 'no' |

Table 1 summarizes various statuses of the device, and actions to be taken by the retailer's agent. In the first two rows, the device is reported by the manufacturer, distributor or retailer as stolen from the distribution channel without being sold. Before a call is made, the agent for the particular device is flagged at the monitoring centre to start tracking functions when it connects to the internet or other network. When a call is made, the agent is instructed to track. In rows 3 and 4, the device is recorded as sold. Before a call is made, the agent for the particular device is flagged at the monitoring centre to disable itself when it connects to the internet or other network. When a call is made, the agent is instructed to disable itself. In rows 5 and 6, the agent is neither reported as stolen nor sold. Without a call being made, the device is assumed to be in the distribution channel. However, if a call is made (row 6), the device is deemed to be a rogue device. In rows 7 and 8, the device is sold and opened but subsequently returned to the store without having been connected to the internet. A call has therefore not been made to the monitoring centre and so the agent in the device is flagged at the monitoring centre for disabling as and when it calls in. In row 9, the device has been sold, then returned to the store without being opened, in which case it is restocked and the 'sold' flag for the agent is reset at the monitoring centre.

Figure 3:
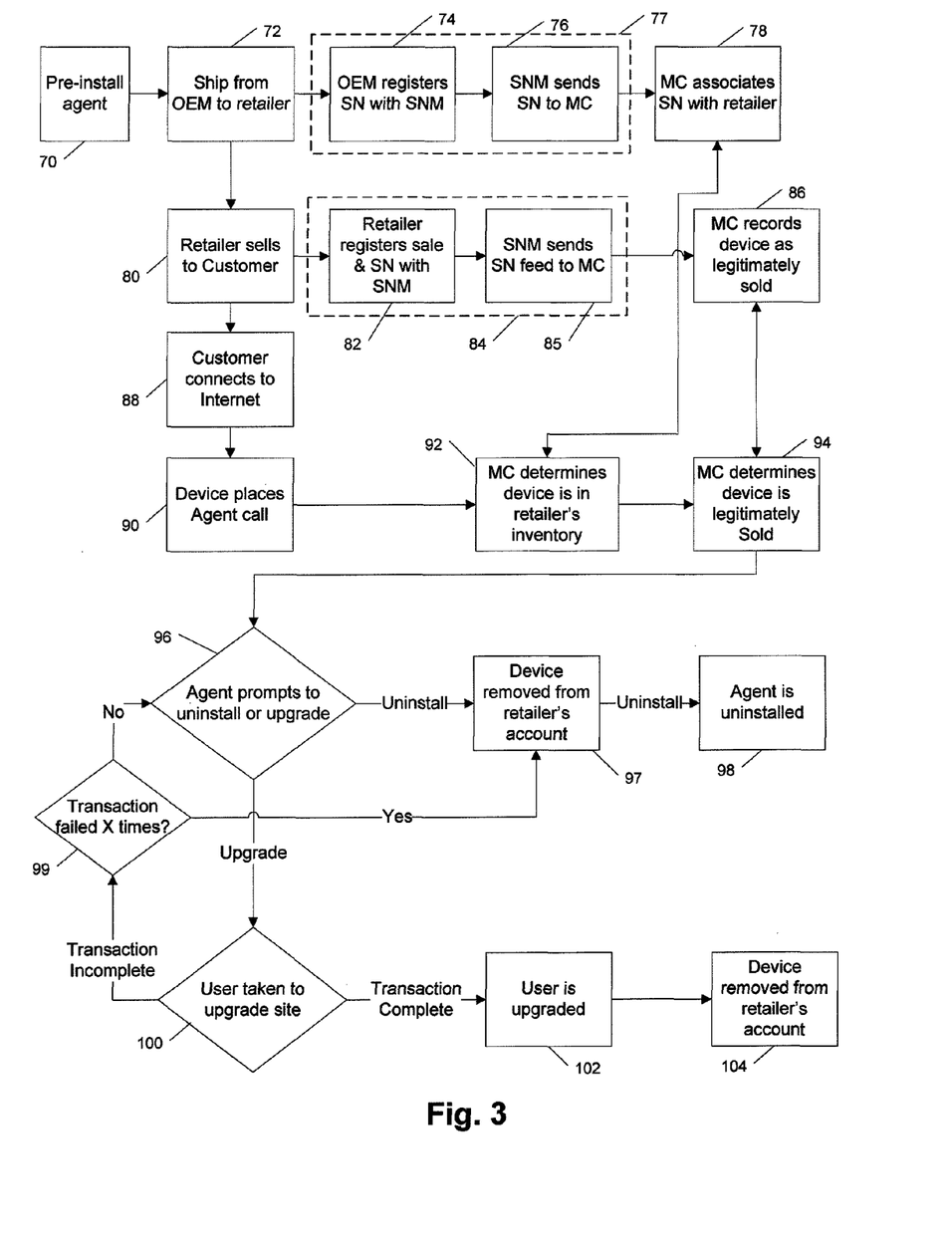
FIG. 3 is a functional flow diagram schematically representing the flow process performed by a system when a device is legitimately sold, in accordance with embodiments of the disclosed subject matter.

FIG. 3 is a functional flow diagram schematically representing the flow process performed by a system when a device is legitimately sold, in accordance with embodiments of the disclosed subject matter.

The agent 21 is pre-installed 70 on a device 20 in the factory, and the device 20 is then shipped 72 from the manufacturer to a retailer. The manufacturer registers 74 the serial number ("SN") of the device with a serial number manager ("SNM"), and the serial number manager sends 76 it to the monitoring centre ("MC") 30 in a data feed. Steps 74 and 76 could be combined in step 77 with the elimination of the serial number manager, and the manufacturer providing the information directly to the monitoring centre 30. The monitoring centre 30 associates 78 the received serial number with the retailer to which the device 20 is destined.

In step 80, the retailer sells the device 20. The retailer registers 82 the sale of the device 20 with the serial number manager, which then sends 85 the detail of the sale to the monitoring centre 30. Steps 82 and 85 may be combined in a single step 84 with the elimination of the serial number manager, and the registering of the sale at the monitoring centre 30 directly by the retailer. The monitoring centre 30 then records 86 the sale of the device 20.

The customer then connects 88 the device 20 to the internet, and the agent 21 in the device 20 places 90 a call to the monitoring centre 30, such as by instructing the device 20 to communicate with the monitoring centre 30. This call may be placed as a background task, without the knowledge of the customer. The monitoring centre 30 receives the call and determines 92, from the agent providing the serial number of the device 20 and the association in step 78, that the device 20 is included in the retailer's inventory. The monitoring centre 30 then checks 94 existing records, made in step 86, and determines that the device 20 has been legitimately sold.

Due to the device 20 being legitimately sold, the agent 21 is instructed 96 to permanently disable itself (or delete itself or uninstall itself), or depending on the configuration chosen, to initiate upsell procedures. It may be configured to give the purchaser a choice 96. If the purchaser decides to uninstall the agent, or even do nothing, the serial number of the device is removed 97 from the retailer's account, and the agent 21 is uninstalled 98. If the purchaser selects the upgrade option, the purchaser is taken 100 to an upgrade website where purchase of a further or continuing agent such as L4L™, LoJack™, LoJack for Laptops™ can be transacted. Once the transaction is complete, the agent is upgraded 102 and details of the initial agent are removed 104 from the retailer's account.

If for any reason the upgrade transaction fails 99, it may be tried again by returning to the prompt in step 96. If the transaction fails too many times 99, it will in preferred embodiments be aborted, the serial number for the device will be removed 97 from the retailer's account, and the agent will be uninstalled 98.

For the process to be effective on the first agent call after the sale, the registering of the sale of a particular serial number by the retailer should be rapid compared to the typical time it takes for a customer to take the device home, open up the box, set up the device and connect to the internet.

Figure 4:
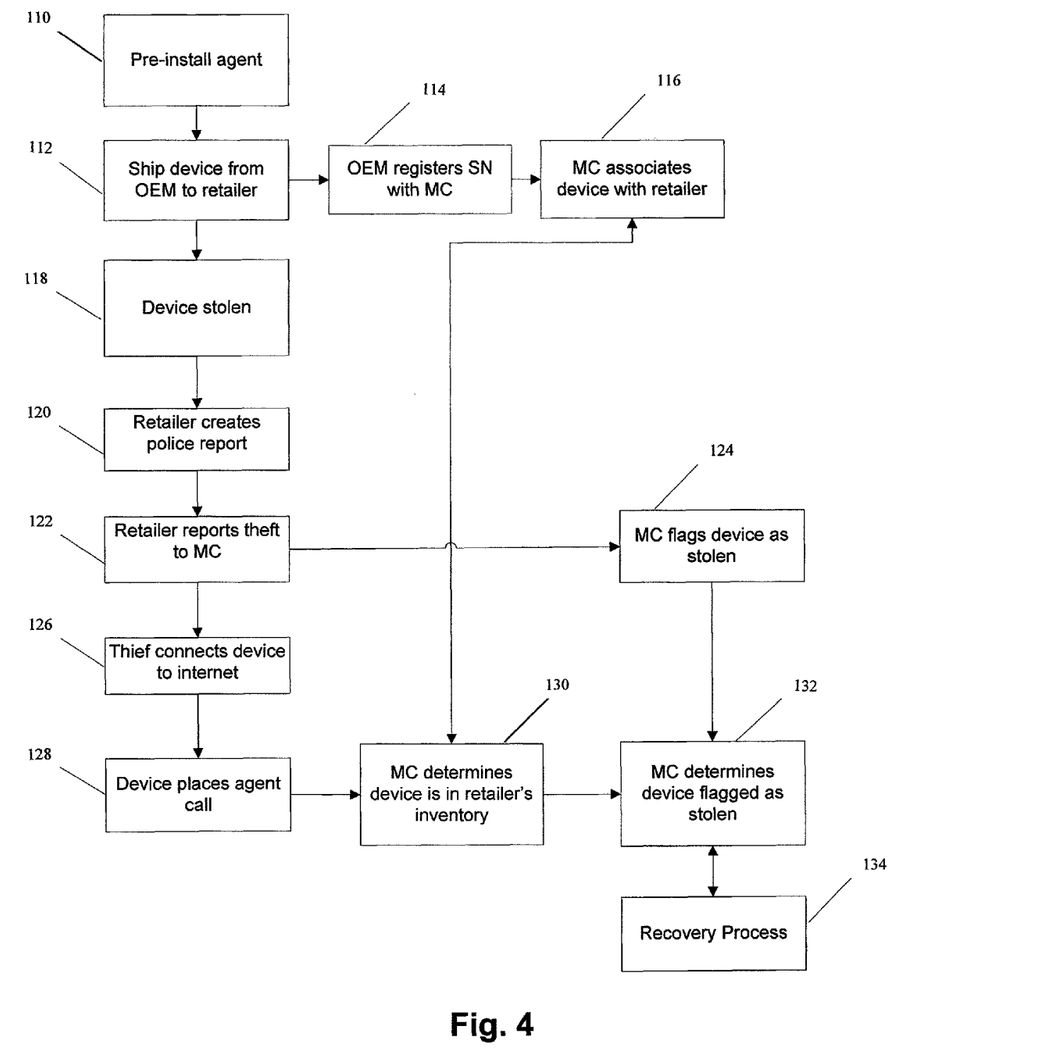
FIG. 4 is a functional flow diagram schematically representing the flow process performed by a system when a device is known to be stolen from a distribution channel, in accordance with embodiments of the disclosed subject matter.

FIG. 4 is a functional flow diagram schematically representing the flow process performed by a system when a device is stolen from a distribution channel, in accordance with embodiments of the disclosed subject matter.

At step 110, the agent 21 is pre-installed on the device 20 in the factory, and the device 20 is then shipped 112 from the manufacturer to a retailer. The manufacturer registers 114 the serial number of the device with the monitoring centre 30. The monitoring centre associates 116 the received serial number with the retailer to which the device 20 is destined.

The device is then stolen 118 from the retailer and the retailer informs the police 120. The retailer also informs 122 the monitoring centre 30, where the device 20 is flagged as stolen 124.

The thief then connects 126 the device 20 to the internet and the agent 21 in the device 20 then places 128 a call to the monitoring centre 30. The monitoring centre 30 receives the call and determines 130, from the agent 21 providing the serial number of the device 20 and the association in step 116, that the device 20 is included in the retailer's inventory. The monitoring centre 30 then checks 132 existing records, made in step 124, and determines that the device 20 has been flagged as stolen. As a result, the agent 21 is instructed to perform 134 tracking functions that would not otherwise be performed, such as regularly or irregularly providing IP addresses of the connections made to the internet, recording and providing screenshots, taking photos, capturing keystrokes, providing alerts or instructions on how to return the device, or disabling in full or in part the operation of the device 20. The tracking functions may preferably be performed invisibly to the thief.

Figure 5:
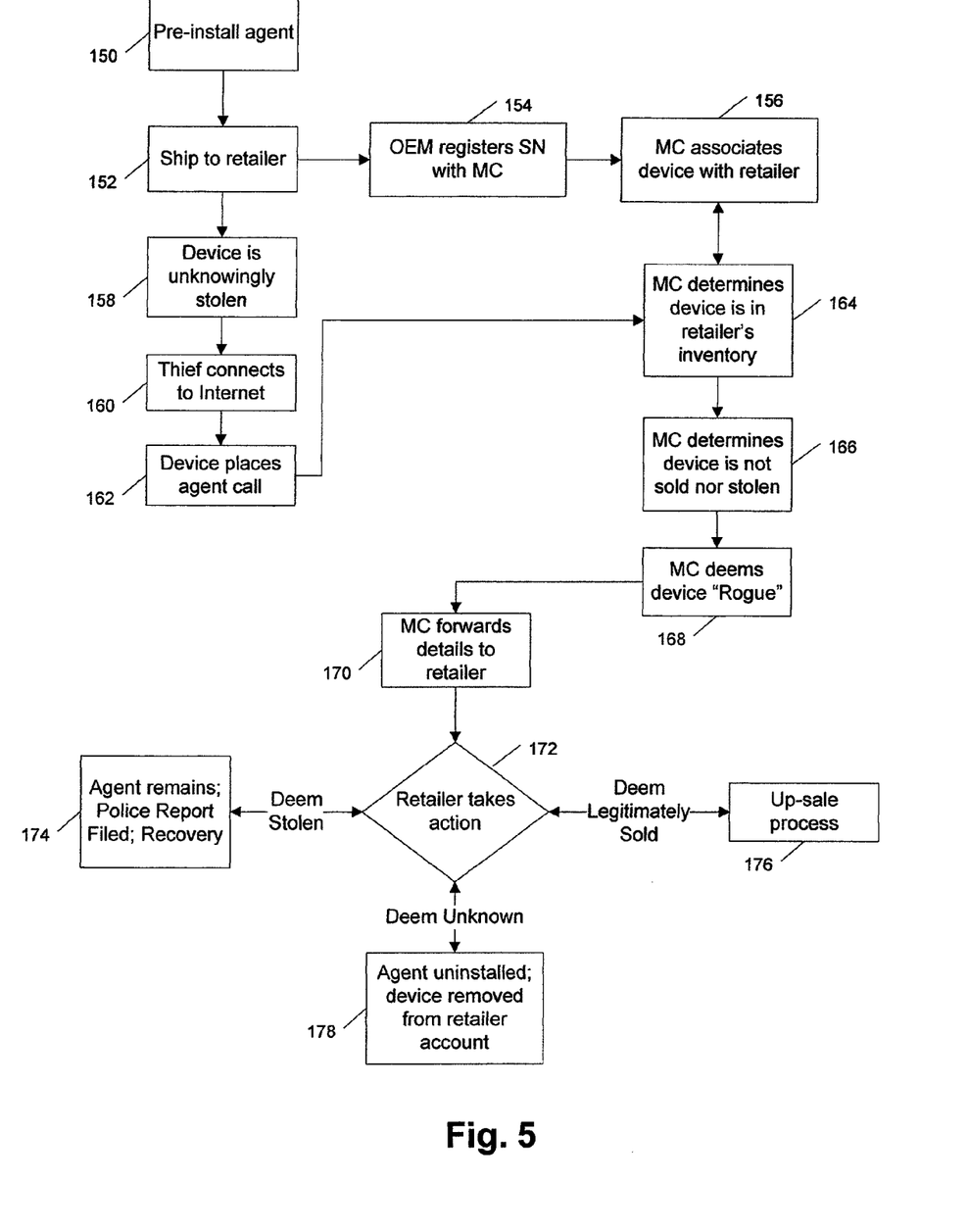
FIG. 5 is a functional flow diagram schematically representing the flow process performed by a system for a rogue device, in accordance with embodiments of the disclosed subject matter.

FIG. 5 is a functional flow diagram schematically representing the flow process performed by a system for a rogue device, in accordance with embodiments of the disclosed subject matter.

At step 150, the agent 21 is pre-installed on the device 20 in the factory, and the device 20 is then shipped 152 from the manufacturer to a retailer. The manufacturer registers 154 the serial number of the device 20 with the monitoring centre 30, and the monitoring centre 30 associates 156 the received serial number with the retailer to which the device 20 is destined.

The device 20 is then stolen 158 from the retailer without the retailer's knowledge. The thief then connects 160 the device 20 to the internet, and the agent 21 in the device 20 places 162 a call to the monitoring centre 30. The monitoring centre 30 receives the call and determines 164, from the agent 21 providing the serial number of the device 20 and the association in step 156, that the device 20 is included in the retailer's inventory. The monitoring centre 30 then checks 166 existing records, finds that the device 20 has neither been reported as stolen nor sold, and as a consequence deems 168 that the device 20 is a rogue device.

The monitoring centre 30 then automatically sends 170 a message to the retailer that the device 20 with the particular serial number is 'suspicious' or rogue. This message could, for example, be an email to an individual (e.g. staff member of the distribution channel or retailer) who may be steered to an appropriate web page that links to a serial number manager or the monitoring centre 30. The retailer can then investigate 172 whether the device 20 was indeed sold, and not recorded properly as a sale, in which case the retailer can inform the monitoring centre 30 and the agent 21 can then be instructed to proceed to the upsell procedures 176. The retailer may also determine at step 172 that there was indeed a theft, in which case the police and the monitoring centre 30 can be informed 174, allowing the agent 21 to be instructed by the monitoring centre 30 to go into tracking mode as described above. It may also be the case that the retailer cannot determine at step 172 what happened, in which case the monitoring centre 30 can be informed and the agent 21 may be uninstalled 178 to protect a potential bona fide purchaser from invasion of privacy.

The benefit of this process is that it provides an alert to the OEM, distributor and/or retailer that a device 20 is connected to the internet, or is being used in possibly an unauthorized manner, and that an investigation should be made. This is especially useful for large retailers or networks of retailers with many different staff members being collectively responsible for numerous devices distributed in many locations.

Figure 6:
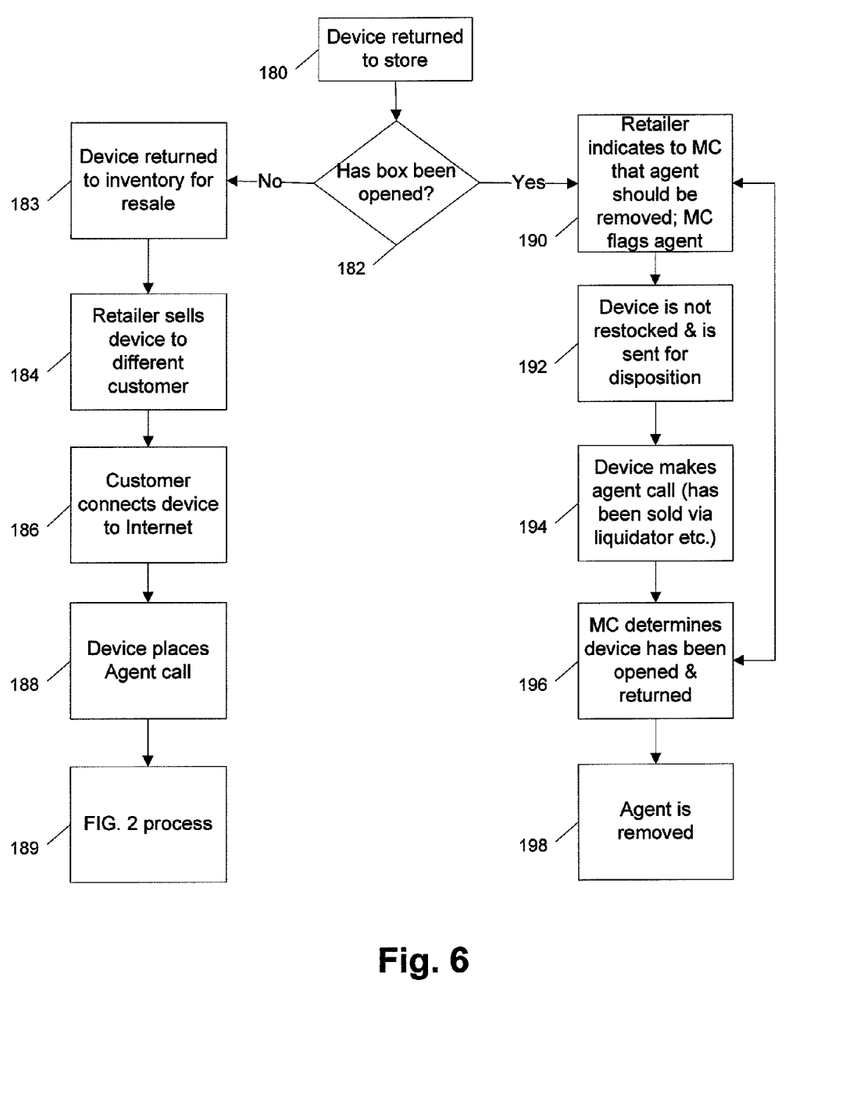
FIG. 6 is a functional flow diagram schematically representing the flow process performed by a system when a device is returned to a store, in accordance with embodiments of the disclosed subject matter.

FIG. 6 is a functional flow diagram schematically representing the flow process performed by a system when a device is returned to a store, in accordance with embodiments of the disclosed subject matter.

If a device 20 is returned to the store after the device's packaging has been opened, there is generally a risk that the device is not in the "as new" state, particularly if it is a device that can be programmed or have software installed upon by a customer. Retailers would not in most cases want to risk reselling such devices in the same way as new devices, and may want to uninstall an agent if the customer has not already done so.

At step 180, a device 20 is returned to the retailer. If at step 182 the box or the packaging is unopened, then the retailer may want to re-sell the device 20 and so returns 183 the device 20 to inventory for re-sale. The retailer sells 184 the device 20 to a new customer, who connects 186 it to the internet following which the agent 21 places 188 a call to the monitoring centre 30. The process then continues 189 as in FIG. 2.

If at step 182 the device's packaging has been opened or the device 20 has been used, the retailer may not want to re-sell it. In this case, the retailer indicates 190 to the monitoring centre 30 that the agent 21 should be removed, as the retailer would desire to dispose of the device 20 by means other than selling it to a regular consumer. The monitoring centre 30 then flags the agent 21 for removal, and the retailer sends 192 the device 20 for disposition, for example to a liquidator. The agent 212 in device 20 then makes a call 194 to the monitoring centre 30, where it is determined 196 that the retailer has requested removal of the agent (i.e. because it was opened and returned to the store). The monitoring centre then instructs 198 the agent 21 to uninstall itself.

If a customer has already upgraded the retailer's agent to a full scale LoJack™ agent or other tracking agent before returning the device 20 to the store, then the customer can contact the monitoring centre 30 to flag the new agent for removal and to arrange to reinstall it in another device.

ADDITIONAL VARIATIONS AND EMBODIMENTS

Agent persistence may be less of a requirement in the scenario of theft from a distribution channel than in a theft from a consumer. If a thief is does not know that an agent is deployed and they steal a boxed product or demonstration model, it is unlikely that they will reinstall the operating system, as there will be no password to get past. In this case, a retailer agent that is not persistent may be deployed. However, better protection will be achieved with a persistent agent.

Time delays between the steps in the workflow diagrams may be introduced and optimally set for the system's proper and effective functioning. For example, in FIG. 2, after a legitimate sale, a thief could feasibly (but probably not often) steal a laptop and connect it to the internet before the customer has a chance to do so. In this case, the thief could request removal of the agent before the theft is reported by the customer. Thieves could, for example, lie in wait in the store, the parking lot, or could follow the purchaser home. No-one may at this moment be paying to protect the machine between the store's cash register and the user's home since the customer in theory may not yet have purchased additional agent protection, and the store protection has been terminated. While not necessarily the store's problem, customers may expect to be protected from theft in this way, especially if in-store advertising is planned. This could be overcome, for example, by delaying the uninstall process (e.g. for a few hours, a day, a few days or a week or two) until after the actual uninstall request, which would give ample time for a purchaser suffering a loss to phone the retailer or get in touch with the monitoring centre and have the uninstall cancelled.

Ownership might transfer from an OEM to a store either on products leaving the factory, or on arrival at the store. Changes in ownership may also increase if one or more third party distributors serve different stores and takes intervening ownership of the products. If the tracking device has access to a long-lived power source while the device is effectively switched off, tracking communications could be made during transit. The device could use a separate power source, or it could use its own battery on a minimal and occasional basis. The agent could also wake up the device, or certain parts of it, for occasional communications. In this way, the agent may detect changes of ownership while in transit. This can be facilitated by a GPS functionality where included in the device. Ownership changes may also be detected based on the device arriving at a particular geographic location at a particular time.

Optional features may be included to allow the device to come with, for example, "one year of free L4L™". In this case, the customer will be aware of the duration of the tracking period, and the agent will be configured to operate for one year from the date it detects a change in ownership—for example by calling in to a monitoring centre. On switching on the device for the first time, and the agent making its first post-sale call, the customer would supply updated contact details or uninstall the agent. If the customer does not register, nor uninstall the agent, the device could be marked as "sold but not re-registered", which would still allow the agent to call in from time to time to see whether the device has been reported stolen. In the case of theft, tracking could start.

As an alternate to relying solely on the interne, the agent may make its first contact via, for example, a mobile telephone. Telephone numbers could be reserved and assigned to the devices, and may be for single use for making the first call to the monitoring centre from devices that are legitimately purchased. After registration or uninstallation by the new owner, the number may automatically be unassigned. If, during the first call, the agent discovers that the device has been reported stolen, the number could optionally continue to be used until recovery has been made.

By default, all devices protected by the system may be associated with a particular retailer if the system is set up as dedicated to a single retailer.

Multiple Agents

There is the possibility that multiple agents may need to co-exist on a device. For example, a retailer may decide to stock a certain manufacturer's laptop that has Lojack for Laptops™ pre-loaded as part of a "six month free trial". The retailer may also want their own or a distributor's Computrace™ tracking agent to be installed so that the device is tracked if it is stolen from the store. If there are two agents, and if the device is connected to a network, then the retailer's agent should preferably call first, not the "free trial" agent. In this example, the retailer's agent can be set to operate with a higher priority than the free trial agent so that, if the device is stolen from the distribution channel, the retailer's agent begins to operate rather than the free trial agent. If the device is sold and the customer logs in, the retailer's agent calls in to a monitoring centre and detects that the device has been legitimately sold, disables itself and makes way for the free trial agent to take over.

Alternately, a single agent may be configured to operate both as a retailer's agent and a free trial agent. On the first call to the monitoring centre, the agent detects whether the device has been flagged as stolen, and if it has, the agent stays in the retailer mode. If the device has not been stolen, the agent converts to the free trial mode.

If the device is sold legitimately and the retailer wants to pitch a discount up-sell to the customer for a tracking agent such as Lojack™, then on the first call after a legitimate purchase, the user could be prompted by the agent to enter a special offer code which would allow the purchaser a discount off the usual price. Alternately, the retailer could sell 'authorization codes' to the purchasers of the devices, which would allow upgrading from the retailer's agent to the Lojack™ agent without any further charges.

The functions of the system are best shown in the attached figures, and the present description includes the best presently contemplated mode of carrying out the subject matter disclosed and claimed herein. The description is made for the purpose of illustrating the general principles of the subject matter and not be taken in a limiting sense; the subject matter can find utility in a variety of implementations without departing from the scope of the disclosure made, as will be apparent to those of skill in the art from an understanding of the principles that underlie the subject matter.

What is claimed is:

1. An automated method of remotely monitoring and controlling an electronic device, the method comprising:
    by a computer system of a monitoring center:
        receiving a call over a network from the electronic device, said call initiated by an agent installed on the electronic device, said agent including functionality for tracking usage of the electronic device and for reporting information regarding said usage to the monitoring center, the agent thereby facilitating recovery of the electronic device when stolen;
    in response to the call:
        determining, at least, whether a sale of the electronic device has been reported and whether the electronic device is reported as stolen;
        by communication with the agent, causing the electronic device to enter into a state that is dependent, at least, upon the determination of whether a sale of the electronic device has been reported, said state affecting whether the agent reports information to the monitoring center regarding usage of the electronic device; and
    in response to determining that the electronic device has not been reported as sold and is not reported as stolen, (1) causing the electronic device to execute a rogue device procedure, and (2) causing an alert message to be transmitted to a manufacturer or distributor of the electronic device, said alert message representing a determination that the electronic device placed the call while having a status of both not sold and not reported as stolen.

2. The method of claim 1, wherein the method comprises, in response to detecting that a sale of the electronic device has been reported, causing the electronic device to enter into a state in which the agent does not report information regarding usage of the computing device.

3. The method of claim 2, wherein the method further comprises, in response to detecting that a sale of the electronic device has been reported, causing the electronic device to prompt a user thereof to upgrade or replace the agent.

4. The method of claim 1, wherein the state additionally depends on whether the electronic device has been reported as stolen.

5. The method of claim 1, wherein the state additionally depends on whether the electronic device is reported as having been returned to a store.

6. The method of claim 1, wherein the manufacturer or distributor is a retail entity.

7. The method of claim 6, wherein the method further comprises, in response to determining that the electronic device has not been reported as either sold or stolen, and in response to determining that the electronic device has been reported as associated with a particular retail entity, causing an alert message to be transmitted to the retail entity.

8. The method of claim 1, wherein the information regarding usage comprises information reflective of a location of the electronic device.

9. A system for remotely monitoring and controlling in a distribution channel an electronic device comprising a processor and a device memory, and an interface for connection to a communications network, the system comprising:
   an agent installed on the electronic device, the agent including functionality for tracking usage of the electronic device and for reporting information regarding said usage to a monitoring center, the agent thereby facilitating recovery of the electronic device when stolen; and
   a monitoring center comprising an interface for connection to a communications network, a processor and a monitoring center memory comprising a database of information relating to reported sales and reported thefts of electronic devices, said monitoring center being configured to:
      receive a call over a network from the electronic device, said call initiated by the agent installed on the electronic device;
      in response to the call, determine, at least, whether a sale of the electronic device has been reported and whether a theft of the electronic device has been reported;
      by communication with the agent, cause the electronic device to enter into a state that is dependent, at least, upon the determination of whether a sale of the electronic device has been reported, said state affecting whether the agent reports information to the monitoring center regarding usage of the electronic device; and
      when the electronic device has not been reported as either sold or stolen: (1) cause the electronic device to execute a rogue device procedure, and, (2) cause an alert message to be transmitted to a manufacturer or distributor of the electronic device, said alert message representing a determination that the electronic device placed the call while having a status of both not sold and not reported as stolen.

10. A computer system comprising at least one physical computer, said computer system programmed, via executable instructions stored in computer storage, to perform an automated method of remotely monitoring and controlling an electronic device, the method comprising:
   receiving a call over a network from the electronic device, said call initiated by an agent installed on the electronic device, said agent including functionality for tracking usage of the electronic device and for reporting information regarding said usage to the computer system, the agent thereby facilitating recovery of the electronic device when stolen;
   in response to the call, determining, at least, whether a sale of the electronic device has been reported and whether the electronic device is reported as stolen;
   by communication with the agent, causing the electronic device to enter into a state that is dependent, at least, upon the determination of whether a sale of the electronic device has been reported, said state affecting whether the agent reports information to the monitoring center regarding usage of the electronic device; and
   in response to determining that the electronic device has not been reported as either sold or stolen, (1) causing the electronic device to execute a rogue device procedure, and (2) causing an alert message to be transmitted to a retail seller of the electronic device, said alert message representing a determination that the electronic device placed the call while having a status of both not sold and not reported as stolen.

11. The computer system of claim 10, wherein the state additionally depends on whether the electronic device is reported as stolen.

12. A computer system comprising at least one physical computer, said computer system programmed, via executable instructions stored in computer storage, to perform an automated process of remotely controlling an electronic device, the process comprising:
   receiving a call over a network from the electronic device, said call initiated by an agent installed on the electronic device, said agent including functionality for tracking and reporting usage of the electronic device, the agent thereby facilitating recovery of the electronic device when stolen;
   in response to the call, accessing a data repository to determine a status of the electronic device, said data repository including information regarding at least the following conditions: (a) whether the electronic device is registered with a retailer, (b) whether the electronic device is flagged as having been returned to a store, (c) whether a sale of the electronic device has been reported, and (d) whether the electronic device is reported as stolen;
   selecting a procedure to be executed by the agent based on said status, the procedure being dependent upon at least conditions (a)-(d), wherein selecting a procedure to be executed comprises, when the electronic device is determined to be (1) registered with a retailer, (2) not flagged as having been returned to a store, (3) not reported as sold, and (4) not reported as stolen, selecting a rogue device procedure that causes an alert message to be displayed on the electronic device; and
   when the electronic device is determined to have made the call while both (1) not reported as sold and (2) not reported as stolen, causing an alert message to be sent to a seller of the electronic device, said alert message representing a determination that the electronic device placed the call while having a status of both not sold and not reported as stolen.

13. The computer system of claim 12, wherein selecting a procedure to be executed comprises, when the electronic device is determined to be both registered with a retailer and flagged as having been returned to a store, selecting a procedure which causes the agent to become disabled on the electronic device.

14. The computer system of claim 12, wherein selecting a procedure to be executed comprises, when the electronic device is determined to be (1) registered with a retailer, (2) reported as sold, and (3) not flagged as having been returned to a store, selecting a procedure in which the agent offers to a user of the electronic device at least one option for protecting the device from loss or theft.

15. The computer system of claim 12, wherein selecting a procedure to be executed comprises, when the electronic device is determined to be (1) registered with a retailer, (2) not flagged as having been returned to store, (3) not reported as sold, and (4) reported as stolen, selecting a recovery procedure which enables a location of the electronic device to be remotely tracked.

16. The computer system of claim 12, wherein the process additionally comprises causing a rogue device alert message to be sent to the retailer if the electronic device is determined to be (1) registered with a retailer, (2) not flagged as having been returned to a store, (3) not reported as sold, and (4) not reported as stolen.

* * * * *